United States Patent [19]

Zahniser

[11] 4,219,324

[45] Aug. 26, 1980

[54] PROCESS FOR TREATING METALS USING RECYCLED GASES

[75] Inventor: James A. Zahniser, Severna Park, Md.

[73] Assignee: The C. M. Kemp Manufacturing Company, Glen Burnie, Md.

[21] Appl. No.: 941,680

[22] Filed: Sep. 12, 1978

[51] Int. Cl.³ .......................... F27B 3/22; F27B 5/04
[52] U.S. Cl. ...................................... 432/26; 432/72; 432/209
[58] Field of Search ................ 432/21, 26, 72, 209; 126/91 A

[56] References Cited

U.S. PATENT DOCUMENTS

| | | | |
|---|---|---|---|
| 2,589,811 | 3/1952 | Holcroft | 432/209 |
| 2,799,490 | 7/1957 | Rusciano | 432/209 |
| 3,225,516 | 12/1965 | Smith et al. | 55/62 |

Primary Examiner—John J. Camby
Attorney, Agent, or Firm—Stevens, Davis, Miller & Mosher

[57] ABSTRACT

A process is described for treating metals in a furnace by indirect heating techniques, e.g., by using a radiant tube heater, wherein the gas used for heating is passed out of the furnace, treated in a known manner, and passed back into the furnace to serve as the source for the treating atmosphere or as a carrier gas. Carburization of metals can be carried out by this method which results in a savings in fuel and overall operational expense.

10 Claims, 1 Drawing Figure

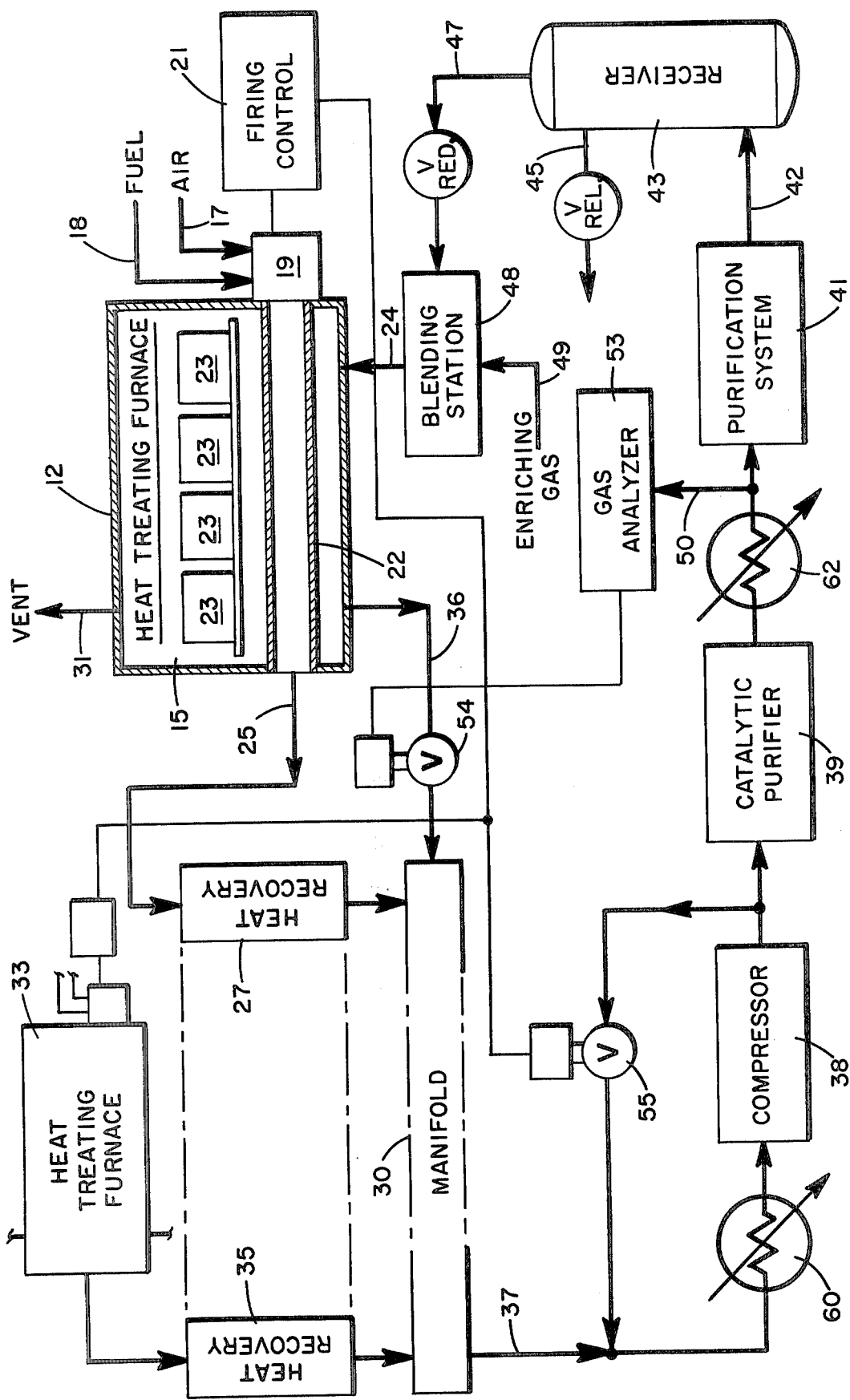

PROCESS FOR TREATING METALS USING RECYCLED GASES

The present invention relates to an improved metallurgical process for metal treating using indirect heating techniques. More particularly, the instant invention relates to an improved process for using an indirect heater, e.g., a radiant tube heater, as the source of heat and as the original source for or as the replenishing source of the treating atmosphere during treatment of the metal.

The use of radiant tube heaters or another type of indirect heater in metal treating processes is well known. Under ordinary operating conditions when a treating gas is used for treating metal, an independent source of the treating gas is employed. It is the purpose of the present invention to take advantage of the combustion products present in an indirect heater or in the radiant tube heater and subject the combustion products to treatments as desired to form a system that can take full advantage of the combustion products in the treatment of metals in the treating furnace. The treated combustion products can be used either as the carrier gas or as the protective atmosphere for the metallurgical process that is being carried out in the furnace.

BACKGROUND OF THE INVENTION

Heat treating processes can be carried out in furnaces of various designs. A work chamber is present in furnaces of these types wherein the heat treating process is carried out. In this work chamber the work temperature is raised to that required for accomplishing the desired treating process. The most common method of heating a furnace is the combustion process, that is, combusting an air-fuel mixture. The heat released from the combustion process heats the work in the furnace to the necessary operating temperature. In order to qualify as a heat treating furnace, the temperature in the furnace must be at least 1400° F. The furnace combustion heating process can be divided into two general heating system classifications, the first being the direct fired heating system. In this system, combustion occurs directly in the furnace work area. Impingement of the combustion flame on the work may or may not be desirable; however, in either instance, the products of combustion directly contact the work. Heating of the work is accomplished by conduction, convection, and radiation. The types of materials heat treated in a directfired furnace do not require an atmosphere other than that which results from the combustion process.

The second classification of furnace heating system is the indirect system involving the use of indirect fired heaters and radiant tube heaters. In this classification of furnace heating systems, the flames from the combustion process and the products of combustion are isolated from the work in the furnace work chamber. In a radiant tube heat treating furnace, for example, combustion occurs within tubes which are located in the furnace work chamber or in other areas. As a result of the combustion, the radiant tubes are heated to the required operating temperature. The radiant tubes, by radiation and convection, heat the work in the work chamber to the necessary operating temperature. The products of combustion for an indirect fired furnace heating system do not come in contact with the work but rather are contained inside the radiant tube heater or indirect fired heater outside the furnace work chamber and are exhausted to the atmosphere. As a result of the isolation of the products of combustion from the work chamber, indirect fired heat treating furnaces afford the user the capability of choosing a controlled furnace atmosphere which will impart desired metallurgical characteristics to the work. The present invention involves this type of furnace heating system.

Current industry practice for obtaining a furnace atmosphere involves combustion of an air-fuel mixture in a gas generator to form a gas of controlled specific composition. Some popular types of gas generators are endothermic, exothermic, and endothermic/exothermic. These gas generators are installed at a location remote to the furnace. The gas from the generator which will be introduced into the heat treating furnace as the furnace atmosphere, is transported from the gas generator through a piping system to the furnace, into which it is introduced as the furnace atmosphere.

In recent times there has been increasing emphasis on energy conservation. There is a need to be more effective and efficient in the use of fossil fuels in the heat treating industry.

As is apparent from the above discussion, a heat treating operation employing a heat treating furnace heated by an indirect furnace heating system and using a furnace atmosphere obtained from a gas generator, has two distinct points at which an air-fuel mixture is consumed. The first point of air-fuel consumption is in the furnace heating system and the second point of fuel consumption is in the gas generator. Present furnace heating systems operate only to utilize the heat resulting from the combustion process to heat the work in the furnace. The products of combustion from the furnace heating system are regarded as waste products and are exhausted to the atmosphere. Gas generators employ the combustion process to obtain a gas of specific composition. The heat liberated or absorbed in a gas generator is a waste product.

A common type of indirect fired heat treating furnace is the radiant tube type furnace. A discussion of the combustion system used with this type of furnace will provide an understanding of combustion principles which generally apply to all indirect fired furnaces.

The combustion system for a radiant tube heat treating furnace comprises an air blower, a burner, and a radiant tube. The combustion process begins with air being drawn into the air blower through an inlet on the air blower. The blower raises the pressure of the air to a level in excess of atmospheric air pressure. This elevated air pressure is the motive force for the combustion system. The air, at an elevated pressure, moves from the blower through the piping system to the burner. At the burner, the air is mixed with fuel in a controlled ratio and ignition occurs. The combustion process occurs within the radiant tube. The positive pressure of the combustion system which originates from the blower is the motive force pushing the products of combustion through the radiant tube and exhausting them to atmosphere. Radiant tube burners may have a primary and secondary air adjustment for the purpose of controlling the length of the flame in the radiant tube. By adjusting the primary to secondary air ratio and establishing a flame throughout the entire length of the radiant tube, one can achieve uniform heat release over the entire length of the radiant tube.

It is the practice in the heat treating industry to fire indirect heating systems with excess air, that is, more air than is required for complete combustion. In general, heat treating furnaces fire with excess air.

The products of combustion from the firing of an indirect heating system with excess air contain carbon dioxide, water vapor, and oxygen. These components of the products of combustion from the firing of radiant tube in general are not present in a controlled heat treating atmosphere. Therefore in the current industry heat treating practices when a protective furnace atmosphere is required to carry out a metallurgical process a controlled atmosphere is introduced into the furnace which contains at most very low levels of the above gases. Some practices are carried out where the controlled atmosphere contains none of the above gases.

The discussion in the General Description of the Present Invention infra will explain how combustion products from radiant tubes can be purified as necessary, that is, removing from the products of combustion carbon dioxide, water vapor, oxygen, or other constituents to levels which will allow the furnace combustion system to function as a heat source and the source of furnace atmosphere.

A metal treating furnace is characterized by the presence of a closed work area in which work is inserted to be heated to the temperature necessary to perform the metallurgical process. Heating by convection and radiation is used to heat the work set forth in the enclosed area and the heat is achieved by using electric heating elements or by the firing of radiant tubes. When fired radiant tubes are used as the source of heat, the combustion products are conventionally vented to the atmosphere and an atmosphere of very specific and controlled composition taken from a source external to the furnace is introduced into the heated work area in order to protect the work from undesirable metallurgical reaction such as oxidation, or to impart specific metallurgical characteristics to the work, for example, carburizing or carbonitriding. At present the source of the atmosphere or carrier gas is an atmospheric generator making use of gases such as endothermic, exothermic, or exothermic/endothermic or industrial gases.

GENERAL DESCRIPTION OF THE PRESENT INVENTION

The present invention is characterized as a carrier gas recovery system or CGR. This characterization implies that the products of combustion (gas) which are currently exhausted from the work chamber or the radiant tube heater to the atmosphere, are recovered, (recovery) purified, and piped to a heat treating furnace to be used as the controlled heat treating furnace atmosphere or carrier gas.

The carrier gas recovery system is an equipment system, which when added to an indirect fired furnace combustion system, and more specifically to a radiant tube combustion system will:

(a) convert an indirect fired or radiant tube furnace combustion system to a system which will allow the recovery of combustion products while the furnace combustion system operates under a negative pressure, atmospheric pressure or a positive pressure. The present invention can therefor be applied to any indirect fired furnace combustion system without affecting the burner flame characteristics;

(b) provide a system concept which will recover, purify, and make available gas of controlled composition for use as a furnace atmosphere or carrier gas for the heat treating process occuring in that or other furnaces;

(c) provide a control system that will detect the failure of a radiant tube, and as appropriate isolate the failed radiant tube from other radiant tubes in the furnace; and (d) provide a system whereby the combustion process occuring in an indirect fired or radiant tube furnace heating system is a source of heat for the furnace and the products of combustion from the furnace heating system are recovered, purified, and available for use as a controlled furnace atmosphere or carrier gas.

The components of the system which are listed below, present the system as it would apply to a radiant tube furnace with one radiant tube. Radiant tube furnaces can have more than one radiant tube, and in general do have more than one radiant tube. This system is applicable to a furnace having more than one radiant tube.

The components of the system include:

a heat exchanger, one for each radiant tube, which reduces the temperature of the products of combustion; gas analyzing equipment which may monitor and control the gas analyses in each radiant tube or only the total system in general; a manifold, into which the cooled products of combustion are piped; a compressor or blower, operating at the inlet at a negative pressure and at the outlet at a positive pressure; a catalyst tower to control the oxygen level of the products of combustion; a gas purification system to purify the products of combustion as required; and a receiver to store the purified products of combustion. From the receiver, the purified products of combustion can be distributed as required.

In such a system, the radiant tubes in the heat treating or carburizing system can be fired either with a premix or a nozzle mix system. Using the nozzle mix system, the mixing and combustion of the air and fuel occur in the burner independent of one another. In such a system the air to fuel ratio of each burner and each radiant heater vary resulting in a varience in heat release and the composition in the combustion products in the radiant tubes. The nozzle mix system for firing of radiant tubes in a heat treating furnace is a most common system used and can be used with the CGR system. However, more precise control of air fuel ratios can be achieved along with resulted heat release and products of combustion by use of a premix system.

A premix system is characterized by the mixing of air and fuel in exact ratios over wide ranges of flow rates at a central installation of premix equipment. After mixing, the now combustible air and fuel gas is piped through fire check equipment to premix burners mounted in the radiant tubes where combustion occurs. The advantage of the premix system as opposed to the nozzle mix system is a more precise control of the air to fuel ratios, uniform air and fuel mixture at each burner, and precise control of the composition of the products of combustion and heat release.

In carrying out the present process, a manifold is attached to the exhaust end of the radiant tubes in order to collect the combustion products from the firing of the radiant heater. It is important that the connections between the radiant tubes and the manifold are air-tight to prevent atmospheric contamination of the combustion products. At this point in the system, the combustion products may contain hydrogen, carbon monoxide, carbon dioxide, water vapor, methane, sulfur dioxide, and nitrogen. The collected products of combustion are monitored for oxygen. If the oxygen level in the combustion products must be lowered, the products are placed into a chamber and mixed with methane, and the amount of methane varying with the level of oxygen in the combustion products in the manifold. The combustion products at this point are approximately at a temperature of 1700° F. The methane reacts with the oxygen in the reaction as follows:

$$2CH_4 + O_2 \rightarrow 2CO + 4H_2$$

in order to remove or lower the $O_2$ levels in the combustion products. After treatment with methane the combustion products can be composed of $SO_2$, $H_2$, $CO$, $H_2O$, $CO_2$, $CH_4$, and $N_2$.

Should the combustion products also contain sulfur dioxide and it is necessary to remove or lower the level of the sulfur dioxide, this may be accomplished by using a caustic scrub or other processes.

After the combustion products have been treated to reduce or remove the sulfur dioxide, the remaining materials can enter a Kemp Molecular Sieve System described with more particularity in U.S. Pat. No. 3,225,516, which disclosure is incorporated herein by reference, or any other gas purification system to purify the combustion products of water and carbon dioxide. Depending upon the metallurgical treatment employed the operator has the option of retaining or removing the water and carbon dioxide in the product.

It is not necessary to undertake each and every treating step described in the specification and, of course, it will depend upon the desired necessary atmosphere or carrier gas required for a particular operation which in turn depends upon the metallurgical process taking place.

A great advantage of the CGR System is that it eliminates the need to have atmospheric generating equipment external to the furnace. The firing of the radiant tubes is now the source of heat as well as being the source of the atmosphere for the process. It is, of course, possible to use the atmosphere in the furnace from which it was obtained, or if desired, in any other furnace requiring the same type of atmosphere.

Since the radiant heater is being used more than just a source of heat a variety of fuels can be used to fire the radiant tube in order to obtain the desired heat release and the products of combustion. Representative fuels that can be used are propane, butane, and fuel oil.

GENERAL DESCRIPTION OF THE DRAWINGS

The invention can be understood by referring to the drawing showing a flow system of the present invention.

DETAILED DESCRIPTION OF THE INVENTION

The following discussion concerns the flow of the air-gas mixture through the combustion system and then through the purification system where it exits as a purified product of combustion. A purified product of combustion is defined as a gas of a specific composition required for the heat treating process occurring in a heat treating furnace.

In the carrier gas recovery concept, the combustion heating system of the furnace is operated as a negative pressure system, i.e., a vacuum system. This type of combustion system pulls the products of combustion resulting from the combustion process through the radiant tube(s), through the heat exchanger, and into the inlet port of the compressor. The level of negative pressure required for the system is determined by calculating the pressure drops in the various components of the system on the system upstream of the compressor. If a failure in a component of the system upstream of the compressor were to occur, the products of combustion within the system would not escape to the atmosphere, because of the negative pressure under which the system operates. If a failure were to occur in a component of the system, the atmosphere surrounding the outside of the component which failed would, because of the negative pressure of the system, be drawn into the system. This principle is used to advantage in the carrier gas recovery system. If a failure were to occur in a radiant tube, and the unpurified products of combustion were to escape the furnace atmosphere, constituents of the unpurified products of combustion, carbon dioxide, and water vapor, for example, may cause undesirable metallurgical changes in the work. To minimize the potential of furnace atmosphere contamination caused by a radiant tube failure, the combustion system is operated under negative pressure which means that the furnace atmosphere surrounding the outside of the failed radiant tube would be drawn into the radiant tube, thereby minimizing furnace atmosphere contamination.

Control of the carrier gas recovery system will achieve the objective of monitoring and controlling the air fuel ratio in each burner, monitoring each radiant tube for failure, and monitoring establishment and continuance of combustion at each burner. At the onset of the discussion of the control process, it is appropriate to indicate that the types of burners used in the firing of radiant tubes can be nozzle mixed burners or premix burners. In the nozzle mix type burner, the mixing of the air and fuel occurs at each burner independent of other burners in the system. In the pre-mix system, there is a central air fuel mixing station in which the air and fuel are mixed. The now combustible air fuel mixture is piped to the burners where combustion occurs. The nozzle mix system is discussed here as it is the most commonly used type of burner to fire radiant tubes; however, either type of combustion system can be used.

Mounted at the burner for the purpose of monitoring the establishment and continuance of flame at the burner is a flame detector unit. In the absence of flame at the burner, the flame detection system will shut off the valves in the gas and air lines to the burner. The operation of the flame detection system is also a function of the negative pressure in the radiant tube. In a condition of no cracks or breaks in the radiant tube, the burner sees a constant negative constant pressure, therefore, a constant flow of air/gas mixture resulting in constant flame geometry. If a crack would occur in a radiant tube, the negative pressure would be distributed over a larger area (the area of the burner plus the area of the crack). The system in maintaining the constant negative pressure in the radiant tubes, would draw furnace atmosphere into the radiant tube ahead of the burner. The negative pressure acting on a larger area (burner area plus area of the crack) would draw a reduced flow of air/gas mixture through the burner. As a result, flame geometry at the burner would be altered. At a predetermined point, when the flame geometry has altered to the extent that the flame detection system is activated, the radiant tube would be closed down. Closing down is effected through the closing of valves and the gas inlet and the air inlet to the burner, and a valve on the outlet side of the heat exchanger.

The control system also consists of instrumentation to monitor the analysis of the cooled gas exciting the heat exchanger. Control of the composition of the gas stream can be realized by monitoring appropriate constituents in the gas stream. To control the air to fuel ratio of the burner, the combustibles level or oxygen level of the gas exiting the heat exchanger can be monitored and the air to fuel ratio adjusted as appropriate to control the analysis of the products of combustion. By controlling the combustible level, the oxygen level is controlled or by controlling the oxygen level, the combustion level is known.

The gases upon leaving the radiant tube pass through a pipe to the inlet side of the heat exchanger.

There is one heat exchanger for each radiant tube. The heat exchanger reduces the temperature of the products of combustion to approximately 100° F.

The cooled products of combustion are then piped from the heat exchanger to a manifold which collects the products of combustion from all radiant tubes. From the manifold, the products of combustion then enter a compressor at the inlet port under a negative pressure or suction condition. Passing through the compressor the products of combustion exit at an elevated pressure.

After exiting the compressor a catalyst may be included in the system to reduce the level of oxygen as may be required. If lowering the level of oxygen is required, it would occur at this point in the flow of the gas through the system. A source of reducing gas (gas containing such gases as CO, $H_2$, $CH_4$, etc.) is necessary to combine with the oxygen to complete the catalytic reaction. This reducing gas is normally present in the furnace work chamber atmosphere. Therefore, a control valve or orifice can be applied to allow a proper amount of reducing gas to mix with the combustion gases at the exit of the radiant tube. The signal for the control valve can be taken from a combustibles analyzer downstream of the catalytic reactor to assure the proper residual of reducing gases.

The products of combustion then enter a gas purification system of some design. For the purposes of discussion, a Kemp MS System is typical and it is fully described in Kemp U.S. Pat. No. 3,255,516. The Kemp Molecular Sieve System is an adsorption system through which the products of combustion pass, and have reduced levels of carbon dioxide and water vapor upon exiting the system. The products of combustion then enter a receiver and are stored under pressure. The receiver functions as a central storage point and a diluter. The products of combustion from numerous radiant tubes pass through the MS system to the receiver. If, for example, one of the radiant tubes in the system were to crack, the leaking furnace atmosphere in the radiant tube would be diluted in the receiver by the products of combustion from the other properly operating radiant tubes. Thus, protection from abrupt and severe changes in the composition of the purified products of combustion is provided a user of the carrier gas recovery system.

As would be required by the furnace, purified products of combustion are piped from the receiver to the heat treating furnace where the metallurgical process is occurring.

In the figure, the furnace is heated by a radiant tube that is fired by using a premix system of air and fuel. The system is combusted and passes through the radiant tube heater to heat the working furnace. The products of combustion are passed from the radiant tube heater to a manifold wherein the oxygen content is monitored. The combustion product temperature is at approximately 1700° F. at which time the resultant combustion products are treated with methane in order to reduce the oxygen content. These resulting products are then passed to a heat exchanger to reduce the combustion product temperature to 400°/500° F. and oxygen can be passed from the heat exchanger back to the air line for the premix operation. The materials passing from the heat exchanger are then passed into a catalyst for reduction of the carbon dioxide level by introduction of methane for reaction. Thereafter, the combustion products are passed into a heat exchanger and into a scrubber for removal of $SO_2$; thereafter a molecular sieve system can be used and the product passed back into the furnace as the source of the protective atmosphere for the metal material being treated.

DETAILED DESCRIPTION OF THE DRAWINGS

In the FIGURE, there is shown a heat treating furnace generally designated as 12 whose work chamber 15 is heated by indirect firing. Air and fuel are passed through pipes 17 and 18, respectively, combined and fired in an area 19 located outside the heat treating furnace itself. Burners as necessary are located here and the operation is controlled using either standard or special furnace firing controls 21. The combustion products are introduced into the furnace through radiant tube heater 22. The carrier gas or protective atmosphere for the metal treating operation for the metal to be treated 23 is introduced through line 24. The combustion gases are removed through line 25 to heat recovery apparatus (heat exchanger 27) and then into a multiple tube manifold 30. The heat treating furnace 12 has a vent 31 for removal of some of the treating atmosphere or carrier gas. The manifold 30 can be used to collect a plurality of cooled combustion gases. In the drawing, manifold 30 also functions as a collector for the combustion gas from heat treating furnace 33 after the gas has been passed through heat exchanger 35. The manifold 30 can receive some gas from the work chamber atmosphere through line 36. In manifold 30, the cooled combustion gases are collected and passed through line 37 and heat exchanger 60 into compressor 38. Here the gases have their pressure increased to one higher than that of the incoming flow. This means that the system is functioning in a manner to preclude contamination of the treating atmosphere with the combustion gases. Should a system component upstream of the compressor fail, the atmosphere outside the component would be drawn into the system rather than having a discharge of the combustion gases. The compressed gases are then passed into a catalytic purifier 39 and then into purification system 41, after being cooled in heat exchanger 62, to remove any particular component of the stream. Water, carbon dioxide, and the like can be removed using a system such as that described in U.S. Pat. No. 3,225,516. The purified gas then passes through line 42 to a receiver 43 for the storage of those products. The receiver 43 has an excess capacity vent 45 and line 47 for passage of the gas to blending station 48 to permit mixing with an enriching gas 49 prior to entry into work chamber 15. As the carrier gas recovery system of the present invention is operating, a portion of the gas passing between catalytic purifier 39 and purification system 41 is passed through line 50 into gas analyzer 53. Here, the gas is analyzed to determine the various constituents which are present in the gas made up of a combination of the gas from the work chamber 12 and the radiant tube heater 22. If a change in the composition of the gas functioning as the treating gas or as the carrier gas is necessary, the change is undertaken at the blending station 48 or by modifying the operations in the firing controls 21. The gas analyzer is also able to control the flow of gas in the work chamber directly into the manifold 30 through valve 54 and the quantity of gas to be recycled through compressor 38 prior to the gas entering catalytic purifier 39. This is accomplished by control valve 55 which adjusts the compressor capacity to one compatible with the quantity of gas determined by the firing controls 21.

A distinct advantage of the carrier gas recovery system forming the present invention is that it can be varied as necessary to produce purified products of combustion required by the user. Hardware to treat the products of combustion may be added or deleted as necessary. For example, if control of the oxygen afforded by a catalytic purifier is unnecessary, the purifier would not be included; if a control system were needed to monitor only combustibles, it would be necessary to do only that.

The present carrier gas recovery system gives one the capability to use the previously wasted products of combustion from an indirect fired furnace heating system, specifically a radiant tube heater, as the feed stock to be purified as desired to provide a furnace atmosphere. Those acquainted with the art and practice of furnace design know that the two reasons combustion gases cannot be used for furnace atmosphere are:

1. It is necessary to control flame geometry to provide uniform heat distribution and to prevent hot spots on the radiant tube. This objective is accomplished by burner design and operation with excess air, i.e., oxygen in the combustion products. Oxygen is undesirable in furnace atmospheres and prior to now there has not been an economical system for the removal of this oxygen.

2. Other attempts referred to in patent literature to use heating system exhaust gases have focused on changes in heating element or burner design to allow operation without excess air. These attempts have not been accepted due to the serious problem encountered when a heating element (radiant tube) fails. The failure causes contamination of the furnace atmosphere.

The present system overcomes this problem by operating the combustion process at a lower pressure than the surrounding furnace atmosphere.

The system described herein, of course, can be subjected to a variety of additional modifications and the invention should only be restricted by the scope of the claims which are appended hereto.

What is claimed is:

1. A metal heat-treating furnace process comprising:
   (a) generating combustion products in an indirect heater located within a heat-treating furnace containing a metal to be heat-treated, said combustion products serving as a source of heat in said furnace,
   (b) indirectly heating said furnace with said combustion products by passing same through said indirect heater,
   (c) removing said combustion products from said indirect heater within said furnace,
   (d) treating the removed combustion products at a location entirely external to said furnace to deplete oxygen from the removed combustion products without affecting the thermal efficiency of said furnace,
   (e) passing the oxygen-depleted combustion products into said furnace to function as a treating atmosphere for the metal being heat-treated, and
   (f) heat-treating said metal in said furnace in the presence of said oxygen-depleted combustion products.

2. The process of claim 1, wherein the combustion products include $N_2$, $CO_2$, $H_2O$ and $H_2$.

3. The process of claim 2, further comprising combining said combustion products with methane to form part of said treating atmosphere.

4. The process of claim 1, wherein the indirect heating is provided by a radiant tube heater.

5. The process of claim 1, wherein the indirect heating is provided by a plurality of radiant tube heaters.

6. The process of claim 1, comprising treating the removed combustion products with a catalytic purifier to deplete oxygen.

7. The process of claim 1, further comprising subjecting said combustion products to heat exchange and passing the heat-exchanged combustion products into a manifold after removal from said indirect heater and said furnace.

8. The process of claim 7, further comprising passing said combustion products to a compressor located in a line downstream of said heat-treating furnace, thereby increasing the pressure of said combustion products.

9. The process of claim 8, further comprising passing pressurized combustion products into a gas purifier to remove or reduce the amount of at least one of the combustion products.

10. The process of claim 8, further comprising passing a portion of the pressurized combustion products into a gas analyzer after having passed through said catalytic purifier.

* * * * *